United States Patent Office 3,310,385
Patented Mar. 21, 1967

3,310,385
METHOD OF EXTRACTING URANIUM
Benedict L. Vondra, Jr., Greensburg, Pa., assignor to Nuclear Materials and Equipment Corporation, Apollo, Pa., a corporation of Pennsylvania
No Drawing. Original application Dec. 8, 1961, Ser. No. 158,099, now Patent No. 3,208,816, dated Sept. 28, 1965. Divided and this application Nov. 6, 1964, Ser. No. 409,595
5 Claims. (Cl. 23—339)

This application is a division of application Serial No. 158,099, filed December 8, 1961, now Patent No. 3,208,-816 granted Sept. 28, 1965 for "Method of Dissolving Ceramics Containing Beryllia."

This invention relates to the art of separating materials and has particular relationship to the extraction or derivation of at least one component e.g. uranium, from highly refractory materials. Such highly refractory materials are called ceramics in this application and include combinations, mixtures or solid solutions of certain oxides and certain borides. Ceramics may be defined as materials which have a high melting temperature and usually high compressive strength. Such materials are used where resistance to high temperature is demanded. Refractory materials are defined as materials which are resistant to high temperature and to reaction, particularly oxidation. Ceramics and the powders and intermediate materials used in the making of ceramics include important components which resist solution in the available solvents even those that are highly corrosive, e.g., hydrofluoric acid and aqua regia. Specific ceramics with which this invention concerns itself are combinations, mixtures or solid solutions of one or more of the class consisting of uranium oxides ($UO_2$, $UO_3$ or $U_3O_8$), beryllium oxide (BeO), zirconium oxide ($ZrO_2$), aluminum oxide ($Al_2O_3$), zirconium boride ($ZrB_2$). Another such important ceramic is beryllium oxide alone which is very difficult to dissolve by prior art methods.

Typically, $UO_2$ has a melting temperature of 2176° C.; $UO_3$ and $U_3O_8$ decompose into $UO_2$ and oxygen. BeO has a melting temperature of 2530°±30° C. $ZrO_2$ has two forms; one, baddeleyite, has a melting point of 2700° C. and the other, zirconia, a melting point of 2715° C. $Al_2O_3$ has a melting temperature of 2000° C. to 2050° C. $ZrB_2$ has a melting temperature of about 3000° C. and $TiB_2$, 2900° C. While the melting temperature which would classify a material as a ceramic cannot be categorically given, it can be stated that this invention concerns itself with ceramics having melting temperatures of about 2000° C. or greater.

Refractory materials are chemically non-reactive because they are fully reacted. Thus BeO is fully oxidized beryllium. $UO_2$ is not fully oxidized; in the presence of oxygen it becomes $UO_3$. But when $UO_2$ is mixed with BeO the oxidation process is very slow.

An important ceramic with which this invention in its specific aspects concerns itself is a combination, mixture or solid solution of BeO and $UO_2$, $UO_3$ or $U_3O_8$ which may be stabilized by the addition of other oxides such as $ZrO_2$. The word "stabilized" as used here means that the refractory properties of the ceramic are increased. A stabilized ceramic is more highly resistant to chemical treatment than one that is unstabilized. A chemically highly-stable ceramic is a ceramic which resists chemical treatment; i.e., a ceramic which when subjected to chemical reagents is reacted only very slowly or negligibly. Such a highly stabilized ceramic is difficult to dissolve.

The BeO-U oxide ceramic may be formed from a green powder, as a low-fired solid or as a high-fired solid.

The powder consists of a blend of the oxides with a hydrocarbon binder. The low-fired ceramic consists of a solid produced by heating the powder to about 800° C. to 900° C. to burn out the binder. Note that the BeO is not affected by burning out the binder and the $UO_2$ is affected only to a minor extent. A high-fired ceramic consists of a solid produced by sintering the powder or low-fired ceramic at about 1700° C. to 1800° C. The powder may be highly stabilized in the sense that its refractory component or components resists reaction. The low-fired or the high-fired ceramic may be highly stabilized resisting reaction with reagents even when ground.

It is frequently desirable to derive from a ceramic one or more of its components which may be of strategic or economic importance. Typically, it may be desirable to derive uranium from the above described BeO-U oxide ceramic.

It is an object of this invention to provide a method for readily deriving a component or selected components from a ceramic. It is a further object of this invention to reduce a ceramic to a condition in which at least one selected component may be readily derived therefrom by a continuous process. It is a specific object of this invention to provide such a method for, and to so reduce, the ceramic composed of a combination, mixture or solid solution of beryllium oxide and uranium oxide with or without stabilizers.

Selected components may often be derived from a material by dissolving the material and separating out the components. But ceramics have tenaciously resisted attempts to dissolve them in accordance with the teachings of the prior art. The parent application, Ser. No. 158,099 discloses and claims a method for producing a solution, for the extraction of at least one of the components from a chemically highly-stable ceramic, whether high-fired or low-fired or in the form of a green powder, the ceramic including at least one of the class consisting of oxides and borides, and including beryllium oxide alone or beryllium oxide and other oxides. Such ceramics may include beryllium oxide and one or more of the oxides of uranium, zirconium, and aluminum and the borides of zirconium and titanium.

By the practice of this method a solution of beryllium oxide-uranium oxide may be formed. In the case of beryllium oxide-uranium oxide material it is one of the important ultimate specific objects of this invention to separate the beryllium and the uranium which are in solution. This is accomplished by liquid extraction of one of the components (uranium usually) in a liquid solvent (usually organic) which is immiscible with the aqueous solution. Such solvents may be tributylphosphate (TBP) which is usually diluted in another organic solvent and methylisobutyl-ketone (hexone). The uranium is soluble in the organic solvent but in its hexavalent and not in its quadravalent state. But the aqueous solution includes the uranium in the quadravalent state as $UF_4$.

In the practice of this aspect of the invention the uranium is converted to the hexavalent state by oxidation. A nitrate is then added to produce $UO_2{}^{++}$ and $NO_3{}^-$ ions; and then the uranium is extracted as $$UO_2(NO_3)_2 \cdot 2$$

TBP when the TBP is added. Similarly conversion takes place for other organic extract compounds.

A typical uranium derivation process is as follows:
(a) Oxidation:
15 ml. $H_2O_2$ per liter of solution is added to the aqueous solution and heating and stirring is continued until solution becomes clear yellow liquid. (Approx. 30 min.)

(b) Filtration:
  Solution is pumped through filter.

(c) Feed Preparation:
  Solution from the filter is pumped into extraction stage where it is mixed with an equal volume of 2 molar aqueous $Al(NO_3)_3$. This in turn is mixed with 3 molar aqueous $HNO_3$ in a 3–1 ratio yielding a feed solution that is 0.75 M $Al(NO_3)_3$, 0.75 $HNO_3$ and contains approximately 4–6 g. U per liter.

(d) Separation:
  The uranium solution may be decanted or drawn off in any suitable manner.

The above-described process has the disadvantage that the aluminum remains in solution with the beryllium and it is not readily separable from the beryllium and it is one of the specific objects of this invention to provide a separation process in which the beryllium shall be derivable in its relatively pure form.

In accordance with this aspect of this invention, instead of the $Al(NO_3)_3$ beryllium nitrate, $Be(NO_3)_2$ is used; that is $NO_3^-$ ions are derived from $Be(NO_3)_2$ rather than $Al(NO_3)_3$. The $Be(NO_3)_2$ has been found to operate highly satisfactorily and does not involve the problem of subsequently separating out aluminum.

In accordance with this invention then a method is produced of extracting uranium from a solution which includes uranium in the hexavalent state, the said method being characterized by the steps of adding a beryllium nitrate to said solution to derive $NO_3^-$ ions to convert said uranium to a nitrate complex and extracting said uranium as a nitrate with a liquid of the class consisting of tri-butyl-phosphate and methyl-isobutyl-ketone.

The reference to the addition of beryllium nitrate to the solution above and elsewhere in this specification or in the claims means, not only the direct addition of beryllium nitrate to the solution, but also such addition of components, such as beryllium hydroxide and nitric acid, which result in $Be^{++}$ ions and $NO_3^-$ ions.

This complexing of the uranium may be understood by considering the reactions which take place as the solution is converted.

The aqueous solution initially includes $UO_2^{++}$, $UF_2$, $UF_4$, $BeF_4$, $H^+$ ions and $H_2O$. An oxidizer such as $H_2O_2$ or $KMnO_4$ may be added. This has the effect of converting the uranium to the hexavalent state. The reaction which takes place may be defined as follows:

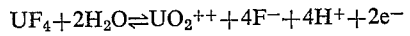

$e^-$ in this equation represents an electron with its negative charge. The charge is shown to manifest the charge balance in the solution.

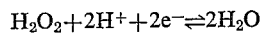

adding each side respectively and canceling equal terms

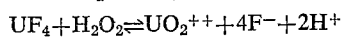

The solution now contains:

The addition of the $Be(NO_3)_2$ produces $2NO_3^-$ ions per molecule of $Be(NO_3)_2$ and with the addition of an organic liquid such as TBP the uranium is extracted in the organic liquid as uranyl nitrate-TBP complex, for example $UO(NO_3)_2 \cdot 2TBP$. The $Be(NO_3)_2$ is advantageous as a salting agent to take up the uranium, i.e., it decreases the solubility of the uranium in the aqueous part of the solution so that the uranium is transferred to the organic part of the solution, i.e., to the TBP. The $Be(NO_3)_2$ has an advantage in complexing the fluoride in applications such as the above-described, i.e., it produces the $BeF_4^{--}$ thus removing the fluorine from the $UF_4$.

The complete separation of uranium starting with a beryllium-oxide-uranium-oxide ceramic is described in the following paragraphs.

METHOD (1) It was desirable to determine the lowest HF concentration that would give the highest concentration of U in the shortest reaction time. Using $HF(NO_3)_2 \cdot H_2O$ crystals as a catalyst this was accomplished by adding varying amounts of the beryllium-uranium oxides to 24%, 36% and 48% HF solution, noting the time and the results of reaction. During the trials it was determined the particle size of the powdered pieces should not exceed 100 mesh U.S. Standard for *best* results in dissolving.

(2) It was then desirable to find the most efficient method of salting the solution with $NO_3^-$, complexing the $F^-$ and oxidizing any $U^{++++}$ present. This was accomplished by:

(a) Holding the amount of $Al(NO_3)_3$ constant and varying the amounts of $HNO_3$ added.
(b) Holding the $HNO_3$ constant and varying the amounts of $Al(NO_3)_3$ added.
(c) Changing the times allowed for oxidation.
(d) Alternate addition of $HNO_3+H_2O_2$ at different solution temperatures; both with and without $Al(NO_3)_3$ present.
(e) Addition of $Be(OH)_2$ in place of $Al(NO_3)_3$, to Be solutions with various concentrations of aqueous solutions of $HNO_3$.
(f) Use of $KMnO_4$ in place of $H_2O_2$.
(g) Variation of extraction methods i.e., use of 15% TBP and 20% TBP in kerosene; No. of extraction stages required.

RESULTS (1) The most advantageous ratio of ceramic to HF (aqueous) is 20 g./100 ml. of 35% HF with a minimum of 0.4 g. Hg $(NO_3)_2 \cdot H_2O$ crystal as a catalyst.

(2) Raising the temperature reduces the time needed for the reaction to start. It then proceeds vigorously for a few minutes reaching 110° C. after which it reacts more slowly. Temperature must be maintained at about 80° C.–90° C. to complete the dissolution.

(3) $KMnO_4$, as compared to $H_2O_2$, seems to be the more efficient oxidizing agent. A concentration of 0.5 to 1.0 g. is sufficient to oxidize the uranium.

(4) If $Al(NO_3)_3$, is added, a concentration of

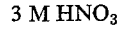

proves adequate, but if $Be(OH)_2$ is used a higher concentration of nitric acid is needed.

(5) A concentration of 15% TBP (in kerosene) on three contacts with the feed was sufficient to lower the U concentration from approximately 10 mg./ml. to less than .01 mg./ml.

PURPOSE OF THE WORK (1) To reduce concentration of HF needed to dissolve ceramic powder;
(2) To reduce, if not eliminate, $HNO_3$ needed;
(3) To use $Be^{++}$ as complexing ion rather than $Al^{+++}$ to make possible more ready recovery of Be;
(4) To improve purity of the final product.

*Method for 1*

A slurry of 200 grams of $BeO-UO_2$ powder per liter of water was produced and catalyst (Hg) (a fraction of a gram as a compound usually a nitrate) added. Aqueous HF was added dropwise to the mixture until a concentration of 30% HF was reached. The mixture heated while stirring for 30 min. after all reaction had ceased. $KMnO_4$ was added and, after allowing resulting solution to stand overnight, approximately 10% of the powder was left undissolved. The stoichiometric quantity $KMnO_4$ was added to convert this quadravalent uranium to hexavalent uranium. It was concluded that the HF concentration should be increased to at least 35%.

Method for 2

A plurality of solutions of BeO-UO$_2$ powder were prepared from slurries each of 200 grams powder in a liter of water and the experiments tabulated in Table I below conducted. Each separate experiment number in Table I indicates a separate dissolving step; a subletter following the number indicates the same starting solution but a different treatment.

4 grams per liter but in larger batches this could probably be reduced.

(3) The concentration of ceramic should not exceed about 200 g./l. Since a final concentration of 35% HF is required, the slurry should be made up to 400 g./l. and by the slow addition of 70% HF, brought to the required concentration. This also enables the rate of reaction to be controlled.

TABLE I

| Expt. No. | Reagents Added | Results |
|---|---|---|
| H-Be-25 | 3 M HNO$_3$; 0.5 M Al(NO$_3$)$_3$·9H$_2$O | Concentration of U before extr.=8.8 mg./ml. After 3 passes with about 20% TBP in kerosene; U concentration=3.3 mg./ml. |
| H-Be-26 | 1.0 M Al(NO$_3$)$_3$·9H$_2$O | Concentration of U before extr.=8.5 mg./ml. After 3 passes with 20% TBP in kerosene; U concentration=1.02 mg./ml. |
| H-Be-26a | 1.0 M Al(NO$_3$)$_3$·9H$_2$O | After two more passes in kerosene; U concentration=0.01 mg./ml. |
| H-Be-26b | 1.0 M Al(NO$_3$)$_3$·9H$_2$O and 3 M HNO$_3$; 1.0 M Al(NO$_3$)$_3$ added. | After 3 passe with 20% TBP in kerosene; U concentration= 1.4 mg./ml. After 2 passes with 20% TBP in kerosene; U concentration=less than .01 mg./ml. |
| H-Be-27 | 2 M Al(NO$_3$)$_3$·9H$_2$O | Concentration of U before extr.=6.4 mg./ml. After 3 passes with 15% TBP in kerosene; U concentration=0.01 mg./ml. |
| H-Be-27a | 1 M Al(NO$_3$) solution and 3 M HNO$_3$ | After 3 passes with 15% TBP in kerosene; U concentration=0.012 mg./ml. |
| H-Be-29 | 1 M Al(NO$_3$)$_3$ solution and 2 M HNO$_3$ | Concentration of U before extr.=6.3 mg./ml. After 3 passes with 15% TBP in kerosene; U concentration=0.14 mg./ml. |
| H-Be-29a | 1 M Al(NO$_3$)$_3$ solution and 3 M HNO$_3$ | U before extr.=6.28 mg./ml. After 3 passes with 15% TBP in kerosene; U concentration=0.42 mg./ml. |
| H-Be-29b | 1 M Al(NO$_3$)$_3$ solution | U before extr.=6.2 mg./ml. 3 passes with 15% TBP in kerosene; U concentration=<0.01 mg./ml. |
| H-Be-29c | 1 M Al(NO$_3$)$_3$ solution | U before extr.=6.2 mg./ml. 3 passes with 15% TBP in kerosene; U concentration=<0.01 mg./ml. |

In the experiments from H-Be-25 to H-Be-27 (excepting H-Be-27a) crystalline Al(NO$_3$)$_3$·9H$_2$O was added directly. In all cases after standing not less than 1 hour the resulting solution salted out i.e., the uranium passed into the TBP. In all further experiments Al(NO$_3$)$_3$ is added as a solution.

Method for 3

In attempting to determine the feasibility of using Be$^{++}$ ions, the above solution H-Be-29 of the Method for 2 was used. The results are shown in Table II below.

(4) Even after the required amount of HF has been added and all bubbling ceases, it is necessary to maintain a temperature of at least 80° C. for a short time to complete the dissolution.

(5) During dissolution the mixture should be stirred continuously.

(6) Before the mixture is removed from heat and with continuous stirring, KMnO$_4$ should be added until a pink color persists. This amount varies. The amount used in these experiments usually averaged about 2 g. KMnO$_4$ per 100 g. of dissolved ceramic.

(7) Filter.

TABLE II

| Expt. No. | Concentrations | Results |
|---|---|---|
| H-Be-29d | 0.5 M Be(OH)$_2$ solution and 4.0 M HNO$_3$ | Concentration of U before extr.=6.2 mg./ml. After 3 passes with 15% TBP in kerosene; U concentration=1.5 mg./ml. |
| H-Be-29e | 1.0 M Be(OH)$_2$ and 4 M HNO$_3$ | U before extr.=6.14 mg./ml. After 3 passes with 15% TBP in kerosene; U concentration=0.43 mg./ml. |
| H-Be-29f | 2.0 M Be(OH)$_2$ and 4.0 M HNO$_3$ | U after 3 passes with 15% TBP in kerosene; U concentration=0.09 mg./ml. U after 5 passes with 15% TBP in kerosene; U concentration=0.01 mg./ml. |
| H-Be-29g | 2.0 M Be(OH)$_2$ and 4.0 M HNO$_3$ | U after 4 passes with 15% TBP in kerosene; U concentration=0.01 mg./ml. |

Method for 4

In attempting to improve the purity a new solution of BeO-UO$_2$ was used. The results are shown in Table III.

(8) The solution at this point can be treated one of two ways before extraction:

(a) Make the solution 1 M Al(NO$_3$)$_3$ by the addition of a 2 M solution of Al(NO$_3$)$_3$, or

TABLE III

| Expt. No. | Extraction Conditions | Results |
|---|---|---|
| H-Be-30a | 1 M Al(NO$_3$)$_3$ | U$_3$O$_8$ as a solid contained 5-15 parts per million Be. |
| H-Be-30b | 0.5 M Al(NO$_3$)$_3$ and 1.5 M HNO$_3$ | U$_3$O$_8$ contained 5-15 parts per million Be. |
| H-Be-30c | 2 M Be(OH)$_2$ and 4 M HNO$_3$ | U$_3$O$_8$ contained 5-15 parts per million Be. |
| H-Be-30d | 5 M HF and 1 M Al(NO$_3$)$_3$ | U$_3$O$_8$ contained 5-15 parts per million Be. |

CONCLUSIONS

Based on the above results and the data contained in the earlier work, the procedure for the recovery of U from beryllium oxide-uranium oxide ceramics should incorporate these features.

(1) Ceramics should be powdered to at least 100 mesh U.S. Standard.

(2) The slurry should be heated to 60° C. and Hg(NO$_3$)$_2$ added. The amount added should be about (b) Make the solution 2 M Be(OH)$_2$, 4 M HNO$_3$ by the addition of a 4 M Be(OH)$_2$ solution in 8 M HNO$_3$.

(9) Extract.

While preferred embodiments of this invention have been disclosed herein, many modifications thereof are feasible.

This invention in its broader aspects is applicable to the ceramics comprising one or more of the class consisting of beryllium oxide, uranium oxide, zirconium oxide, aluminum oxide, zirconium boride and titanium boride. But it is emphasized that stabilized or unstabilized combinations, mixtures, or solid solutions of beryllium oxide and uranium oxide, beryllium oxide alone were prior to this invention found very difficult to dissolve by prior art methods and the dissolution of the latter material constitutes an important specific aspect of this invention.

What is claimed is:

1. The method of extracting uranium from a solution which includes uranium in the hexavalent state, the said method being characterized by the steps of adding a beryllium nitrate to said solution to derive $NO_3^-$ ions to convert said uranium to a nitrate complex and extracting said uranium as a nitrate with a liquid of the class consisting of tri-butyl-phosphate and methyl-isobutyl-ketone.

2. The method of claim 1 characterized by that the solution includes beryllium in addition to uranium in the hexavalent state.

3. The method according to claim 1 of extracting uranium from a solution characterized by that the solution includes the uranium in the quadravalent state and further characterized by that the uranium is converted to the hexavalent state producing $UO_2^{++}$ ions before the beryllium compound is added.

4. The method of extracting uranium by liquid-liquid extraction from a solution which includes uranium in the hexavalent state, the said method being characterized by the step of conditioning said solution for liquid-liquid extraction by adding beryllium nitrate to said solution to derive $NO_3^-$ ions to convert said uranium in said solution to a nitrate complex.

5. The method of deriving uranium from a first solution including uranium in the quadravalent state and beryllium, the said method comprising converting said uranium in said solution to the hexavalent state to derive $UO_2^{++}$ ions, adding beryllium nitrate to said solution to produce $NO_3^-$ ions, adding a liquid which absorbs said $UO_2^{++}$ ions and said $NO_3^-$ ions as a nitrate and forms a second solution which is immissible in said first solution, and deriving said uranium from said second solution.

References Cited by the Examiner
UNITED STATES PATENTS 2,848,300   8/1958   Warf _____ 23—341

OTHER REFERENCES

Nuclear Science Abstracts, Abstract No. 33,062, vol. 16, No. 24A, p. 4372, Dec. 31, 1962.

CARL D. QUARFORTH, *Primary Examiner.*

L. DEWAYNE RUTLEDGE, *Examiner.*

S. TRAUB, *Assistant Examiner.*